(12) United States Patent
Oshikawa et al.

(10) Patent No.: US 7,333,239 B2
(45) Date of Patent: Feb. 19, 2008

(54) METHOD FOR CONTROLLING A PLURALITY OF PRINTING APPARATUSES

(75) Inventors: Tatsuro Oshikawa, Nagano-ken (JP); Hidekazu Mori, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 964 days.

(21) Appl. No.: 10/616,404

(22) Filed: Jul. 8, 2003

(65) Prior Publication Data

US 2004/0136016 A1 Jul. 15, 2004

(30) Foreign Application Priority Data

Jul. 9, 2002 (JP) ............................. 2002-200038

(51) Int. Cl.
*H04N 1/60* (2006.01)
*G06F 3/12* (2006.01)
(52) U.S. Cl. ..................... 358/1.9; 358/1.15; 358/1.16; 358/527; 710/16; 101/128.4
(58) Field of Classification Search ................. 358/1.9, 358/1.15, 1.16, 523; 101/128.4; 710/16
See application file for complete search history.

(56) References Cited

U.S. PATENT DOCUMENTS 7,110,130 B2 * 9/2006 Moriyama et al. ......... 358/1.15

FOREIGN PATENT DOCUMENTS

| JP | 04-078896 | 3/1992 |
| JP | 10-079865 | 3/1998 |
| JP | 10-193698 | 7/1998 |
| JP | 2000-122833 | 4/2000 |
| JP | 2001-136318 | 5/2001 |
| JP | 2001-186368 | 7/2001 |
| JP | 2002-152545 | 5/2002 |

(Continued)

OTHER PUBLICATIONS

Abstract of Japanese Patent Publication 04-078896, Pub. Date: Mar. 12, 1992, Patent Abstracts of Japan.

(Continued)

*Primary Examiner*—King Y. Poon
*Assistant Examiner*—Quang N. Vo
(74) *Attorney, Agent, or Firm*—Martine Penilla & Gencarella, LLP

(57) ABSTRACT

The present invention provides a technique that ensures control of a distinction among a plurality of printers affecting a resulting print in printing with a plurality of printers. A distributed printing system, in which a distributed print server 100 and a plurality of printers are connected, is constructed. The distributed server 100 pre-stores a standard look-up table that is preset, based on the type of printing media and a print mode, and correction data pre-stored in respective printers. Upon receiving a print job from any one of clients CL1~CL3, the distributed print server 100 specifies an output printer to output the print job, based on operation condition. The distributed print server 100 generates a color conversion table using the standard look-up table and the correction data corresponding to the output printer, and transmits the color conversion data to the output printer as well as the print job. The output printer performs process of color conversion on the print job using the color conversion table, which is provided by the distributed print server 100, and carries out the printing. This application enables compensation of the difference among the plurality of printers using the color conversion table.

6 Claims, 5 Drawing Sheets

FOREIGN PATENT DOCUMENTS

JP         2002-290762      10/2002

OTHER PUBLICATIONS

Abstract of Japanese Patent Publication 10-079865, Pub. Date: Mar. 24, 1998, Patent Abstracts of Japan.

Abstract of Japanese Patent Publication 10-193698 Pub. Date: Jul. 28, 1998, Patent Abstracts of Japan.

Abstract of Japanese Patent Publication 2000-122833, Pub. Date: Apr. 28, 2000, Patent Abstracts of Japan.

Abstract of Japanese Patent Publication 2001-136318, Pub. Date: May 18, 2001, Patent Abstracts of Japan.

Abstract of Japanese Patent Publication 2001-186368, Pub. Date: Jul. 6, 2001, Patent Abstracts of Japan.

Abstract of Japanese Patent Publication 2002-152545, Pub. Date: May 24, 2002, Patent Abstracts of Japan.

Abstract of Japanese Patent Publication 2002-290762, Pub. Date: Oct. 4, 2002, Patent Abstracts of Japan.

* cited by examiner

Fig.3

|  | Print Mode | |
|---|---|---|
|  | Speed Mode | Fine Mode |
| Printing Media — Plain Paper | LUTS1 | LUTS4 |
| Printing Media — Special Paper | LUTS2 | LUTS5 |
| Printing Media — OHP Sheet | LUTS3 | LUTS6 |

METHOD FOR CONTROLLING A PLURALITY OF PRINTING APPARATUSES

BACKGROUND OF THE INVENTION

1. Field of the Invention

The present invention relates to a technique of controlling a plurality of printing devices.

2. Description of the Related Art

A printing system, in which a plurality of personal computers and a plurality of printers are connected together via a network, such as a LAN (Local Area Network), has been widely used. As a recent trend, further technique that causes a print server to distribute print jobs to a plurality of printers connected with the network, what is called distributed printing, has become common. This distributed printing enables parallel printing processing of a number of print jobs with the plurality of printers, and thereby reduces the total time required to the printing.

Image data, which is input in the printer as a print job, typically includes tone data expressed in a color system of R (Red), G (Green) and B (Blue). The printer carries out the printing by converting the tone data expressed in this RGB color system into the tone data in the color system of C (Cyan), M (Magenta) and Y (Yellow).

In some applications, however, even a plurality of color printers of the same type causes color distinction among resulting prints one another in carrying out the printing of a uniform color image through the same process. In the case of using an ink jet printer, such distinction results from, for example, an error of ink discharge quantity by a print head. It is substantially hard to control the above-mentioned distinction among resulting prints by performing perfect calibration at the time of manufacture of the printer.

Those problems regarding the distinction in resulting prints caused by the difference among printers may arise in black-and-white printers as well as in color printers. These problems are not restricted to ink jet printers, but similar problems arise in other types of printers.

SUMMARY OF THE INVENTION

The object of the present invention is thus to provide a technique that ensures control of a distinction in resulting prints among a plurality of printers.

To attain at least part of the above and the other related objects, the present invention is directed to a printing control apparatus that carries out printing with transmission of image data to a plurality of printing devices, wherein the plurality of printing devices are capable of the printing upon input of image data expressed in a first color system and process of color conversion into image data expressed in a second color system, the printing control apparatus comprises: a specification module that specifies the printing device among the plurality of printing devices for carrying out the printing; a color conversion information setting module that sets color conversion information corresponding to the specified printing device, wherein the color information defines the color conversion; and a transmission module that transmits the image data and the color conversion information to the specified printing device.

The "first color system" is defined as a color system of the image data input in the printing device, which includes, for example, a RGB color system, a XYZ color system, a YCbCr color system and a L*a*b* color system. The "second color system" is defined as a color system corresponding to inks used in the printing device, which includes, for example, a CMY color system. "The first color system" and "the second color system" may be defined as a color system of dark black-and-white ink and light black-and-white ink, respectively, where the printing device uses different concentration levels of the black-and-white ink.

According to the present invention, the color conversion using the color conversion information, which is preset corresponding to the printing device, enables control of difference among printing devices, and thus uniforms resulting prints.

In accordance with the present invention, the plurality of printing devices may be black-and-white printing devices, or may include a plurality of color printing devices. The technique of the present invention is effectively used for color printing devices where the distinction in resulting prints easily arises.

In one available example, a group of the color conversion information is defined in the format of a color conversion table that enables tone data in the first color system to be converted into tone data in the second color system. For example, a multidimensional table, in which each set of tone data in the first color system is associated with that in the second color system, may be employed. The use of the color conversion table enables the printing device to process the color conversion at high speed. The color conversion information may be expressed by a function as well as the color conversion table.

The color conversion information may be provided in various formats. For example, the color conversion information, which corresponds to respective printing devices, may be preset independently. The color conversion information may be provided in divided formats in another application; standard color conversion information used in common among the plurality of printing devices and multiple sets of correction data for correcting the standard color conversion information of each printing device. The color conversion information may be generated, based on the standard color conversion information and the correction data corresponding to the specified printing device. Preset of the standard color conversion information and the correction data separately enables control of consumption of memory capacity in the printing control apparatus.

In one application, multiple sets of the standard conversion information may be preset depending on the type of printing media and printing modes, which allows a user to choose one, based on the type of the printing media and the print mode, selected by the user. Typical examples of the "printing mode" include the type of halftoning process, such as the error diffusion method or the systematic dither method, and the resolution of the printing and the type of the printed image, such as nature and animation.

This application enables set-up of preferable color conversion information depending on the type of the printing media and the printing mode. The multiple sets of the correction data may be preset corresponding to the type of the printing media and the printing mode, or common correction data may be preset. The former application advantageously generates more accurate color conversion information, and the latter application effectively prevents the consumption of the memory capacity.

In accordance with the present invention, the printing device for carrying out the printing may be specified, based on operating condition of respective printing devices. This application enables distributed printing with effective use of the plurality of printing devices.

The technique of the present invention is not restricted to the applications of the printing control apparatus discussed above, but may be actualized by a diversity of other applications, such as a printing control method, a computer program attaining such a method and a recording medium in which such a computer program is recorded. Any of the diverse conversion processes as discussed previously may be applied selectively. When the technique of the present invention is attained by the computer program or the recording medium in which such a computer program is recorded, the computer program may be the whole program for driving the printing control apparatus or only the partial program for attaining the characterized functions of the present invention. Typical examples of the recording medium include flexible disks, CD-ROMs, DVD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

BRIEF DESCRIPTION OF THE DRAWINGS

FIG. 3 is an exemplified diagram illustrating a standard look-up table.

DESCRIPTION OF THE PREFERRED EMBODIMENTS

Figure 1:
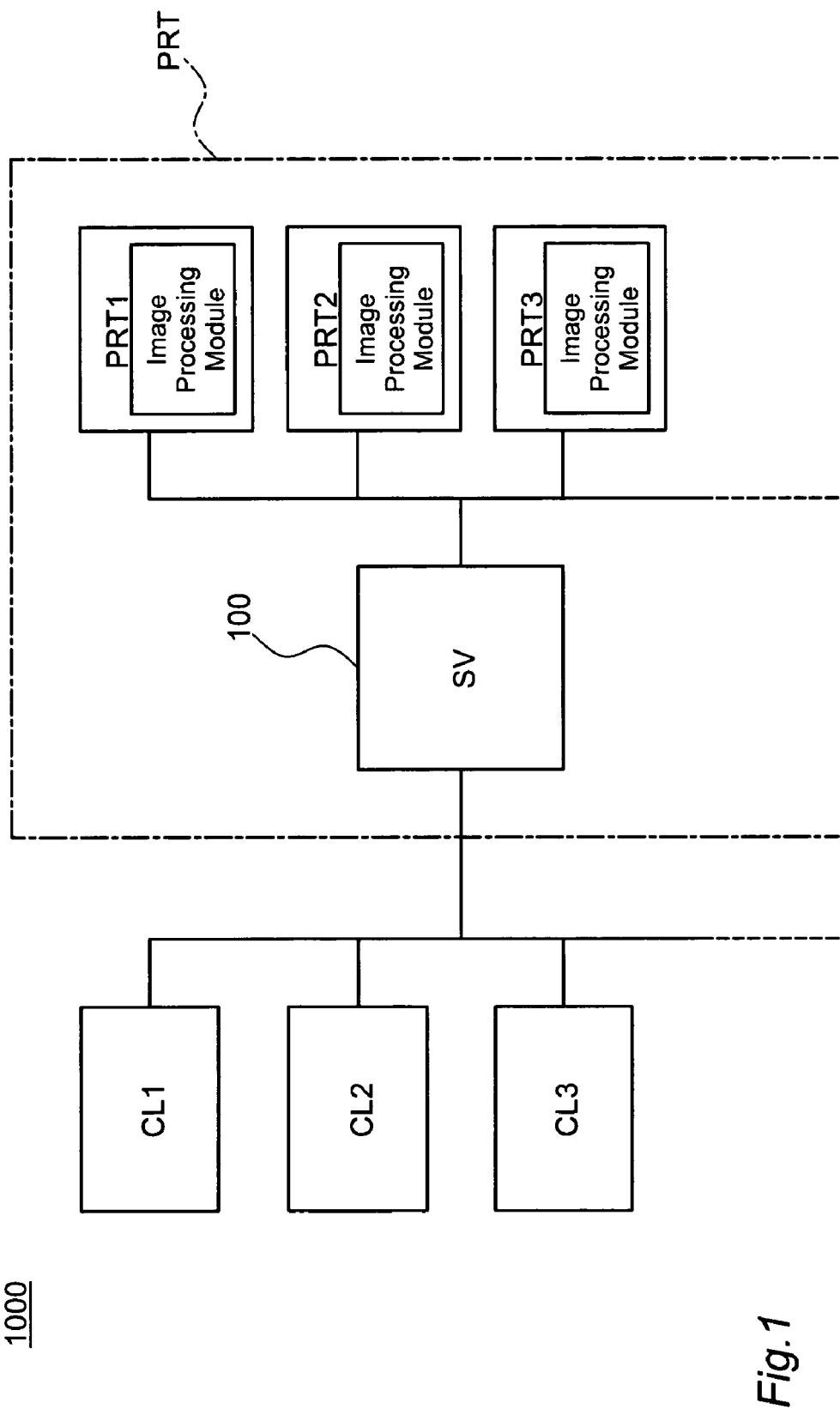
FIG. 1 schematically illustrates the construction of a distributed printing system 1000 in one embodiment.

Some modes of carrying out the invention are discussed below as embodiments in the following order:
A. Distributed Printing System
B. Distributed Print server
C. Processing on Distributed Print server
D. Processing on Printer
E. Modifications A. Distributed Printing System FIG. 1 schematically illustrates the construction of a distributed printing system 1000 in one embodiment. The distributed printing system 1000 includes a distributed print server 100 as a printing control apparatus, a plurality of personal computers CL1, CL2 and CL3, and a plurality of printers PRT1, PRT2 and PRT3.

Personal computers CL1, CL2 and CL3 are connected to the distributed print server 100 via a network. The distributed print server 100 and printers PRT1, PRT2 and PRT3 are locally connected with a cable, such as a serial cable and a USB in conformity with IEEE 1394, where the distributed print server 100 is capable of specifying respective printers. Printers and the distributed print server 100 may be connected via the network. Printers PRT1, PRT2 and PRT3 respectively have an image processing module for carrying out image processing, such as resolution conversion processing, color conversion processing and halftoning process, and carries out the printing by causing the received image data to be subjected to those image processing.

In accordance with the present invention, a plurality of personal computers CL1, CL2 and CL3 refer the distributed print server 100 and printers PRT1, PRT2 and PRT3 as a single logic printer PRT. Upon receiving a print command from personal computers CL1, CL2 and CL3, the distributed print server 100 instructs any one of or multiple printers PRT1, PRT2 and PRT3 to perform the printing.

In accordance with this embodiment, printers PRT1, PRT2 and PRT3 are color inkjet printers of the same type. The distributed print server 100 may accordingly distribute print jobs to any printers. Distribution of print jobs may thus reduce the total time required to the printing processing.

B. Distributed Print server

Figure 2:
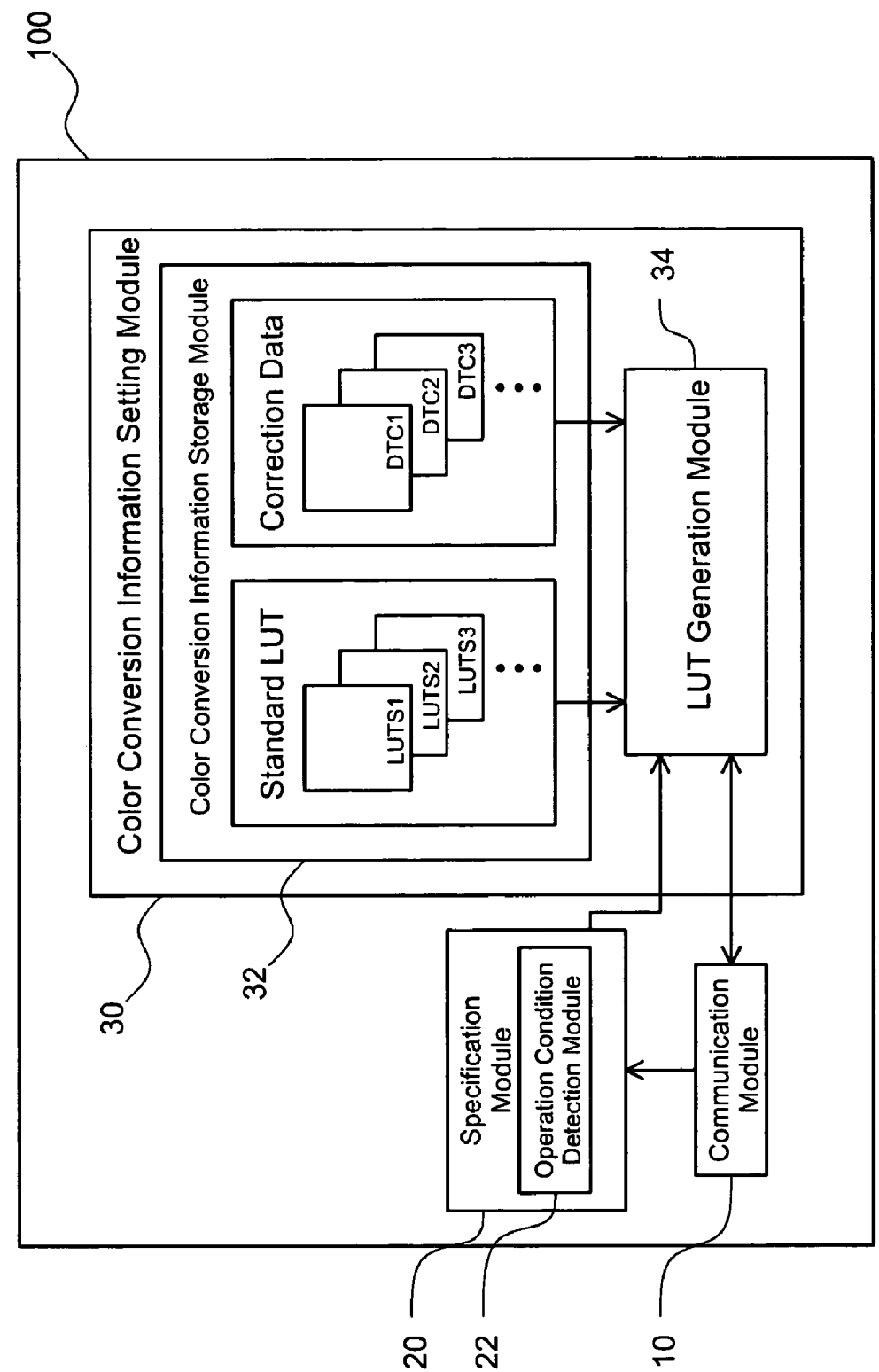
FIG. 2 shows the structure of the distributed print server 100.

FIG. 2 shows the structure of the distributed print server 100. The distributed print server 100 includes a communication module 10, a specification module 20 and a color conversion information setting module 30. The specification module 20 has an operation condition detection module 22. The color conversion information setting module 30 has a color conversion information storage module 32 and a look-up table generation module 34. The respective functional blocks are actualized by software with an installation of a computer program in the distributed print server 100.

The color conversion information storage module 32 stores a plurality of standard look-up tables (LUTS1, LUTS2 and LUTS3) and multiple sets of correction data (DTC1, DTC2 and DTC3). The plurality of standard look-up tables are prepared corresponding to the type of printing media and print modes. In accordance with this embodiment, the standard look-up table is provided in the format of a three-dimensional table that provides tone values of CMY corresponding to respective colors expressed in tone values of RGB. The correction data is provided for correcting each standard look-up table. In accordance with this embodiment, the correction data is provided in the format of a one-dimensional table for correcting respective values of C, M, Y corresponding to each component of R, G, B in the standard look-up table. The correction data is preset corresponding to respective printers PRT1, PRT2 and PRT3. The correction data is set in a manner that respective printers produce nearly the same resulting prints on the same color chart.

The communication module 10 receives operation condition data from printers PRT1, PRT2 and PRT3, which shows the operation condition of respective printers. Available examples of the operation condition data include On/Off status of respective printers, the presence or absence of the printing media and the number of jobs being spooled. The operation condition data is transmitted to the specification module 20. The specification module 20 specifies the printer (Hereafter referred to as an "output printer") for carrying out the printing, based on the operation condition of respective printers, which is detected by the operation condition detection module 22 according to the operation condition data A single or a plurality of output printers may be applied. The specification module 20 then transmits identification information of the output printer to a look-up table generation module 34.

The communication module 10 receives the image data to be printed out and instruction data relating to the printing media and the print mode from personal computers CL1, CL2 and CL3, and transmits the instruction data to the look-up table generation module 34. The look-up table generation module 34 generates a color conversion table to be transmitted to the output printer, based on the standard look-up table and the correction data. Generating the required color conversion table based on the standard look-up table and the correction data may thus reduce consumption of the memory capacity in the distributed print server 10. The communication module 10 transmits the color conversion table, which is generated in the look-up table generation module 34, the image data and the instruction data to the output printer.

FIG. 3 is an exemplified diagram illustrating a standard look-up table. In this embodiment, the user may select three types of printing media; a "plain paper", a "special paper" and "OHP sheet" and two types of print modes; "speed mode" or "fine mode". As shown in this figure, six types of standard look-up tables are prepared corresponding to the pair of print media and the print mode. In one example, a standard look-up table LUTS5 is used for generation of the color conversion table in the case of a pair of the "special paper" and "fine mode". A pair of printing media and the print mode is not limited to examples in the figure. Preparing the standard look-up table corresponding to the printing media and the print mode thus enables the look-up table generation module 34 to generate the color conversion table suitable for respective printing media and print modes.

C. Processing on Distributed Print Server

Figure 4:
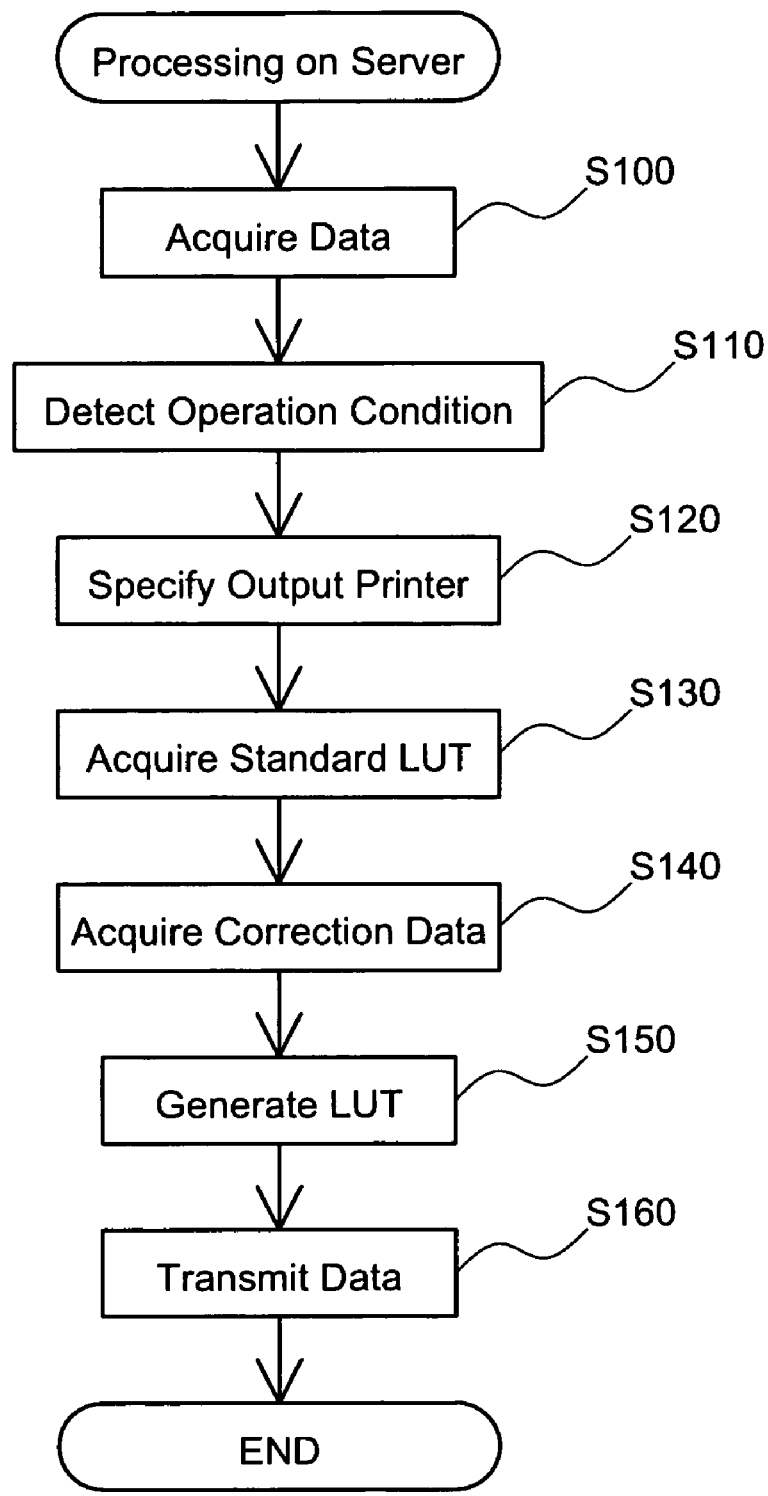
FIG. 4 is a flow chart showing processing on a distributed print server 100.

FIG. 4 is a flow chart showing processing on the distributed print server 100. The distributed server 100 acquires the image data to be printed out and the instruction data regarding the printing media, the print mode and the number of prints from personal computers CL1, CL2 or CL3 (Step S100). The distributed print server 100 then detects the operation condition of respective printers (Step S110) and specifies the output printer, based on the detected operation condition (Step S120).

Next, the distributed print server 100 acquires the standard look-up table depending on the printing media and the print mode and the correction data corresponding to the output printer (Step S130, S140), and thereby generates the color conversion table, based on the standard look-up table and the correction data (Step S150). The distributed print server 100 finally transmits the generated color conversion table, the image data and the instruction data to the output printer (Step S160), and terminates this processing.

D. Processing on Printer

Figure 5:
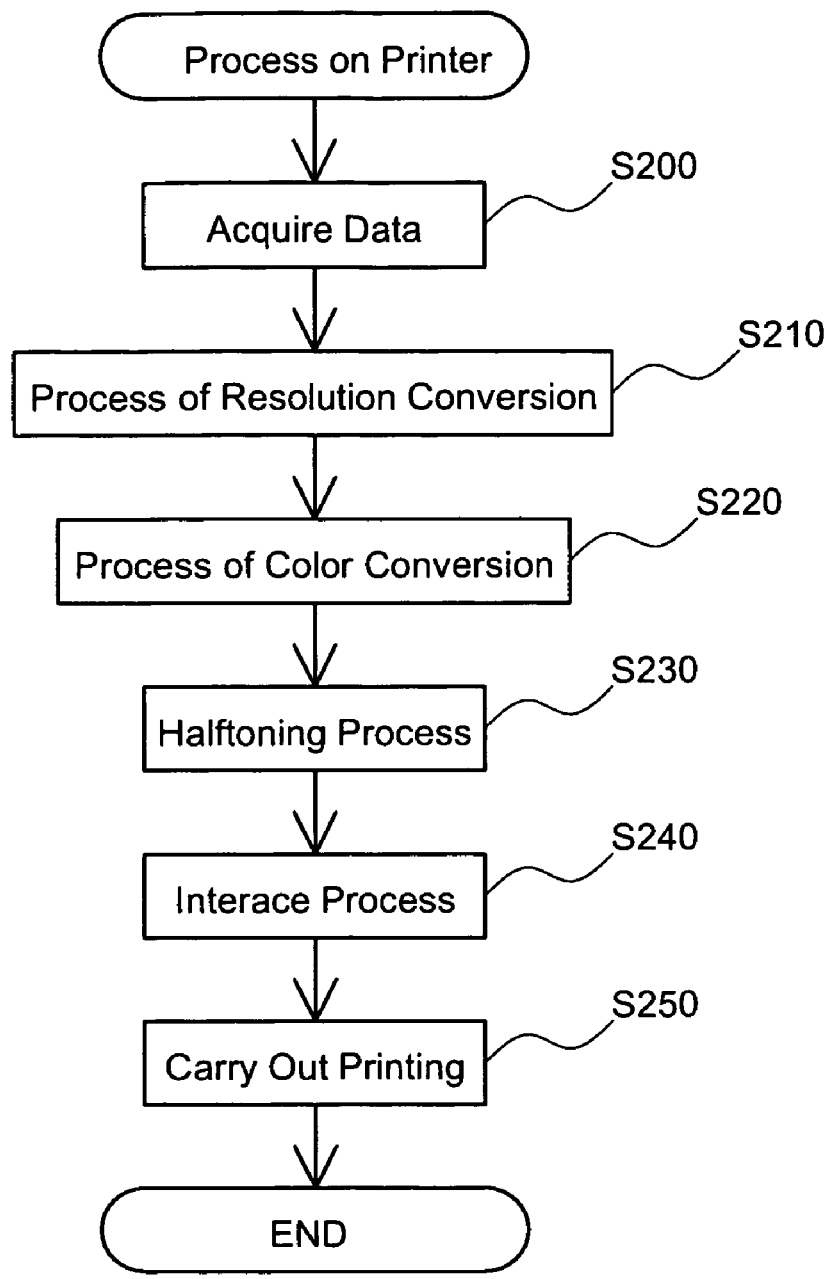
FIG. 5 is a flow chart showing processing on a printer.

FIG. 5 is a flow chart showing processing on the printer. The printer initially acquires the color conversion table, the image data and the instruction data (Step S200).

The printer then carries out process of resolution conversion on the image data, that is, processing for converting the resolution of the acquired image data into the resolution for the printing (Step S210).

Next, the printer carries out process of color conversion on the converted image data (Step S220). The process of the color conversion is provided for the conversion of tone data expressed in RGB color system into the tone data expressed in CMY color system, which is used in the printer. The color conversion table, which is acquired from the distributed print server 100, is used for the process of the color conversion.

The printer then carries out the halftoning process on the image data that is subjected to the process of the color conversion (Step S230). The halftoning process is provided for expressing the image data with 256 tone values by presence or absence of dots.

Next, the printer carries out interlace process (Step S240). The interlace process is provided for sorting an arrangement of each pixel data, based on the order of dots formed by a print head on the printer. The printer carries out the printing depending on thus generated print data (Step S250).

In accordance with this embodiment, the distributed print server 100 may provide the color conversion table corresponding to respective printers PRT1, PRT2 and PRT3 as discussed previously. Each printer may accordingly use the color conversion table received from the distributed print server 100, and thereby prevents distinction among printers, which affects the resulting print.

E. Modifications

The above embodiment and its modifications are to be considered in all aspects as illustrative and not restrictive. There may be many modifications, changes, and alterations without departing from the scope or spirit of the main characteristics of the present invention. For example, the following modifications may be applied.

The printer connected to the distributed print server 100 is not restricted to the color ink jet printer, but may be a diversity of printers, which carries out the printing with the process of the color conversion using the color conversion information. For example, a black-and-white ink jet printer may be applied instead of a color ink jet printer. Not only an ink jet printer but also a thermal-transfer printer and a laser printer may be applied.

The color conversion information is not restricted to the color conversion table, but may be a function.

The color conversion table is not restricted to the table, which is generated based on the standard look-up table and the correction table. In one available application, a plurality of color conversion tables, which corresponds to all printing medium, print modes and printers, are preset.

The technique of the present invention is not limited to a distributed printing given herein, but may be applied to a diversity of printing systems where computers CL1, CL2 and CL3 are allowed to select the output printer directly.

What is claimed is:

1. A printing control apparatus that carries out printing with transmission of image data to a plurality of color printing devices, the plurality of color printing devices being capable of carrying out the printing upon input of image data expressed in a first color system and process of color conversion into image data expressed in a second color system, the printing control apparatus comprising:

a specification module that specifies the color printing device among the plurality of color printing devices for carrying out the printing;

a color conversion information setting module that sets color conversion information corresponding to the specified color printing device, the color conversion information defining the color conversion, wherein a group of color conversion information is defined in the format of a color conversion table that enables tone data in the first color system to be converted into tone data in the second color system, the color conversion information setting module including a color conversion information storage module that stores standard color conversion information used in common among the plurality of color printing devices and multiple sets of correction data for correcting the standard color conversion information, the multiple sets of correction data being preset to respective color printing devices, and a color conversion information generation module that generates the color conversion information, based on the standard color conversion information and the correction data corresponding to the specified color printing device; and a transmission module that transmits the image data and the color conversion information to the specified color printing device, wherein the multiple sets of the standard color conversion information are preset depending on the type of printing media, and wherein the color conversion information generation module generates the color conversion information using the correction data corresponding to the specified color printing device and the standard color conversion information corresponding to the type of printing medium that is selected by a user.

2. A printing control apparatus that carries out printing with transmission of image data to a plurality of color printing devices, the plurality of color printing devices being capable of carrying out the printing upon input of image data expressed in a first color system and process of color conversion into image data expressed in a second color system, the printing control apparatus comprising:

a specification module that specifies the color printing device among the plurality of color printing devices for carrying out the printing;

a color conversion information setting module that sets color conversion information corresponding to the specified color printing device, the color conversion information defining the color conversion, wherein a group of color conversion information is defined in the format of a color conversion table that enables tone data in the first color system to be converted into tone data in the second color system, the color conversion information setting module including a color conversion information storage module that stores standard color conversion information used in common among the plurality of color printing devices and multiple sets of correction data for correcting the standard color conversion information, the multiple sets of correction data being preset to respective color printing devices, and a color conversion information generation module that generates the color conversion information, based on the standard color conversion information and the correction data corresponding to the specified color printing device; and a transmission module that transmits the image data and the color conversion information to the specified color printing device, wherein multiple sets of the standard color conversion information are preset depending on the type of print modes, and wherein the color conversion information generation module generates the color conversion information using the correction data corresponding to the specified color printing device and the standard color conversion information depending on the print mode that is selected by the user.

3. A printing control method for causing a plurality of color printing devices to carry out printing with transmission of image data, the plurality of color printing devices being capable of carrying out the printing upon input of image data expressed in a first color system and process of color conversion into image data in a second color system, the printing control method comprising the steps of:

(a) specifying the color printing device among the plurality of color printing devices for carrying out the printing;

(b) setting color conversion information corresponding to the specified color printing device, the color conversion information defining the color conversion, wherein a group of the color conversion information is defined in the format of a color conversion table that enables tone data in the first color system to be converted into tone data in the second color system, the setting of the color conversion information corresponding to the specified color printing device including preparing standard color conversion information used in common among the plurality of printing devices and multiple sets of correction data for correcting the standard color conversion information, the correction data being preset to respective printing devices, and generating the color conversion information, based on the standard color conversion information and the correction data corresponding to the specified printing device; and (c) transmitting the image data and the color conversion information to the specified color printing device:

wherein the multiple sets of the standard color conversion information are preset depending on the type of printing media, and wherein the step (b) generates the color conversion information using the correction data corresponding to the specified color printing device and the standard color conversion information corresponding to the type of the printing media that is selected by a user.

4. A printing control method for causing a plurality of color printing devices to carry out printing with transmission of image data, the plurality of color printing devices being capable of carrying out the printing upon input of image data expressed in a first color system and process of color conversion into image data in a second color system, the printing control method comprising the steps of:

(a) specifying the color printing device among the plurality of color printing devices for carrying out the printing;

(b) setting color conversion information corresponding to the specified color printing device, the color conversion information defining the color conversion, wherein a group of the color conversion information is defined in the format of a color conversion table that enables tone data in the first color system to be converted into tone data in the second color system, the setting of the color conversion information corresponding to the specified color printing device including preparing standard color conversion information used in common among the plurality of printing devices and multiple sets of correction data for correcting the standard color conversion information, the correction data being preset to respective printing devices, and generating the color conversion information, based on the standard color conversion information and the correction data corresponding to the specified printing device; and (c) transmitting the image data and the color conversion information to the specified color printing device, wherein the multiple sets of the standard color conversion information are preset depending on the type of print modes, and wherein the step (b) generates the color conversion information using the correction data corresponding to the specified color printing device and the standard color conversion information corresponding to the type of the printing mode that is selected by the user.

5. A computer readable recording medium in which a computer program that causes a plurality of color printing devices to carry out printing with transmission of image data upon input of the image data expressed in a first color system and process of color conversion into the image data in a second color system is recorded, the computer readable recording medium causing the computer to perform the functions of:

specifying the color printing device among the plurality of color printing devices for carrying out the printing;

setting color conversion information corresponding to the specified color printing device, the color conversion information defining the color conversion, wherein a group of the color conversion information is defined in the format of a color conversion table that enables tone data in the first color system to be converted into tone data in the second color system, the function of setting the color conversion information corresponding to the specified color printing device including the functions of referring standard color conversion information used in common among the plurality of color printing devices and multiple sets of correction data for correcting the standard color conversion information, the multiple sets of the correction data being preset to respective color printing devices, and generating the color conversion information based on the standard color conversion information and the correction data corresponding to the specified color printing device; and transmitting the image data and the color conversion information to the specified color printing device– wherein the multiple sets of the standard color conversion information are preset depending on the type of printing media, and wherein the function of setting the color conversion information corresponding to the specified color printing device generates the color conversion information using the correction data corresponding to the specified color printing device the standard color conversion information corresponding to the printing media that is selected by a user.

6. A computer readable recording medium in which a computer program that causes a plurality of color printing devices to carry out printing with transmission of image data upon input of the image data expressed in a first color system and process of color conversion into the image data in a second color system is recorded, the computer readable recording medium causing the computer to perform the functions of:

specifying the color printing device among the plurality of color printing devices for carrying out the printing;

setting color conversion information corresponding to the specified color printing device, the color conversion information defining the color conversion, wherein a group of the color conversion information is defined in the format of a color conversion table that enables tone data in the first color system to be converted into tone data in the second color system, the function of setting the color conversion information corresponding to the specified color printing device including the functions of referring standard color conversion information used in common among the plurality of color printing devices and multiple sets of correction data for correcting the standard color conversion information, the multiple sets of the correction databeing preset to respective color printing devices, and generating the color conversion information based on the standard color conversion information and the correction data corresponding to the specified color printing device; and transmitting the image data and the color conversion information to the specified color printing device, wherein the multiple sets of the standard color conversion information are preset depending on the type of print modes, and wherein the color conversion information setting function generates the color conversion information using the correction data corresponding to the specified color printing device and the standard color conversion information corresponding to the print mode that is selected by the user.

* * * * *